Jan. 12, 1926. 1,569,218
C. W. DAKE
ELECTRIC MACHINE
Filed Dec. 10, 1923 3 Sheets-Sheet 1

INVENTOR
Charles W. Dake.
BY
ATTORNEY

Jan. 12, 1926.

C. W. DAKE 1,569,218

ELECTRIC MACHINE

Filed Dec. 10, 1923

INVENTOR
Charles W. Dake.
BY Parker & Carter
ATTORNEY

Jan. 12, 1926.                                                  1,569,218
C. W. DAKE
ELECTRIC MACHINE
Filed Dec. 10, 1923        3 Sheets-Sheet 3

INVENTOR
Charles W. Dake.
BY
Parks a Carter
ATTORNEY

Patented Jan. 12, 1926.

1,569,218

UNITED STATES PATENT OFFICE.

CHARLES W. DAKE, OF CHICAGO, ILLINOIS.

ELECTRIC MACHINE.

Application filed December 10, 1923. Serial No. 679,526.

*To all whom it may concern:*

Be it known that I, CHARLES W. DAKE, a citizen of the United States, residing at Chicago, in the county of Cook and State of Illinois, have invented a certain new and useful Improvement in Electric Machines, of which the following is a specification.

My invention relates to improvements in electric machines and particularly to an electric machine wherein the laminated pole pieces may be continuous throughout the magnetic circuit, and wherein there will be a minimum of reluctance. One of the objects of my invention is to provide a built-up preassembled pole piece unit which may be put together in the field with a minimum of difficulty, wherein all dividing lines between the parts cooperating to form the poles and the magnetic circuit are parallel with the direction of travel of the magnetic flux, and wherein a comparatively small field coil may be used. Another object is to provide an electric machine wherein there will be a minimum of magnetic leakage and wherein a relatively light simple casting may be provided for the motor or generator casing. Other objects will appear from time to time in the specification and claims.

My invention is illustrated as applied to a generator though it might equally well be applicable to a motor. The accompanying drawings show—

Like parts are indicated by like characters throughout the specification and drawings.

A is the housing and takes the form of a thin walled cast cylinder having a cylindrical pad $A^1$ cast integral therewith on its inner periphery. This pad terminates in inwardly extending collar or ring $A^2$. $A^3$ is a lug or boss adapted to be used to position the cover, not here shown. $A^4$ is the rotor shaft, the bearings for which are not here illustrated. This rotor shaft carries an armature $A^5$.

B, B are the field laminations. They are all of them identical. The pole pieces are built up by assembling a series of field laminations and riveting them together by through rivets $B^1$, $B^1$ which are passed through the apertures $B^2$, $B^2$ in the laminations. Each lamination has at one side an inward extension $B^3$ terminating in a relatively short arcuate pole surface $B^4$, and at the other side an inward extension $B^5$ having a curved horn $B^6$, having a relatively extended pole surface $B^7$. The extensions $B^3$ are mitered as at $B^8$.

Figure 1:
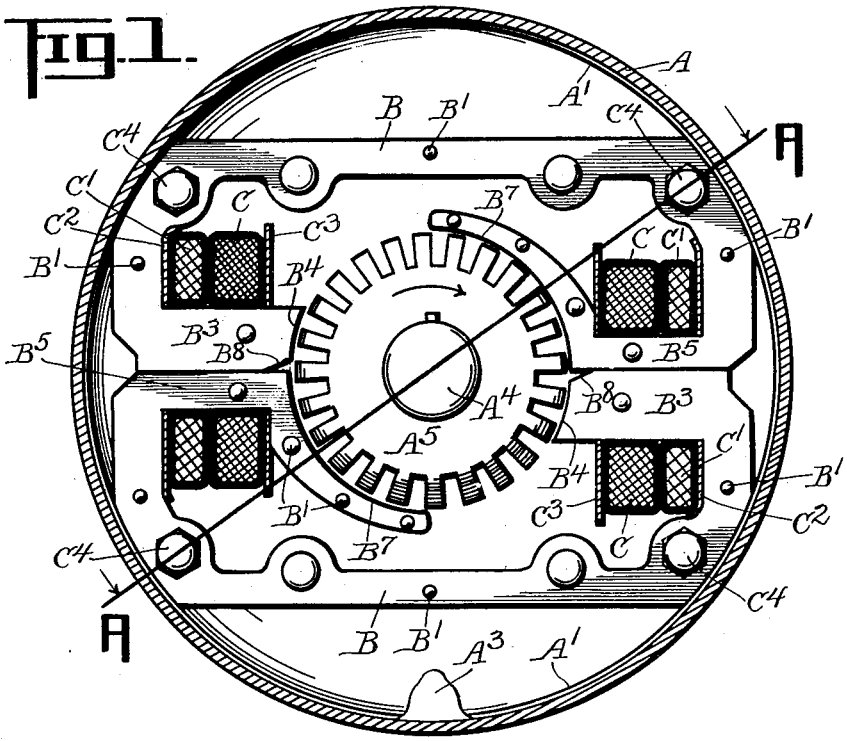
Figure 1 is a section perpendicular to the axis of rotation.
Figure 2:
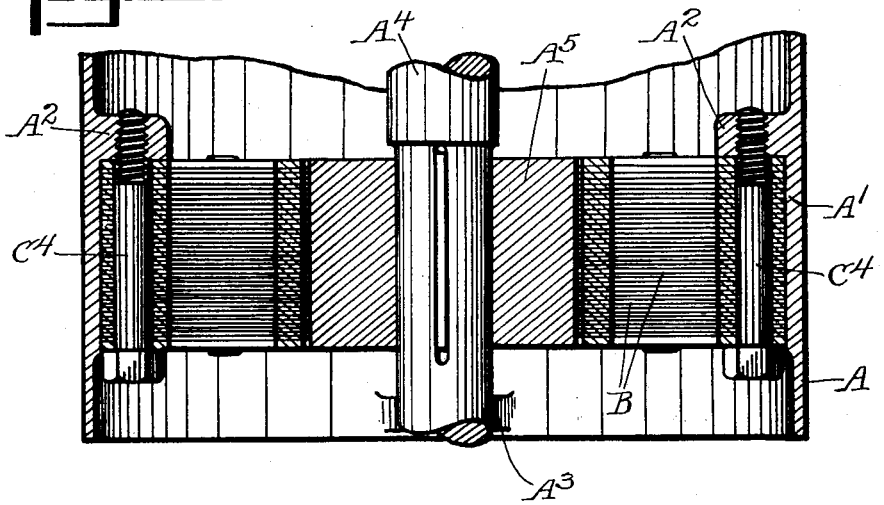
Figure 2 is a section along the line A—A of Figure 1.
Figure 3:
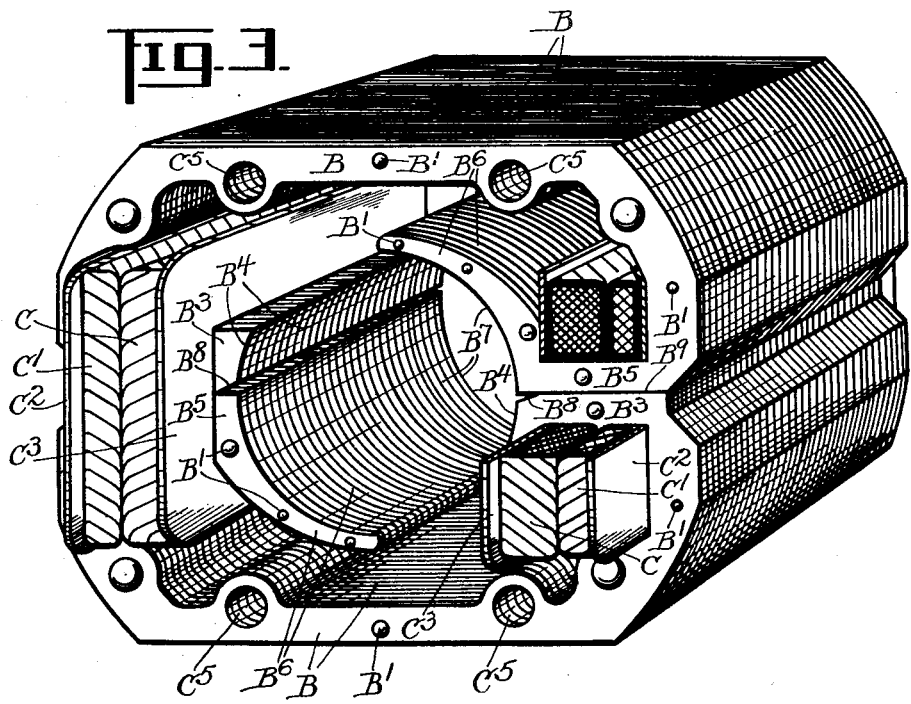
Figure 3 is a perspective of the assembled field with parts in section and parts omitted.
Figure 4:
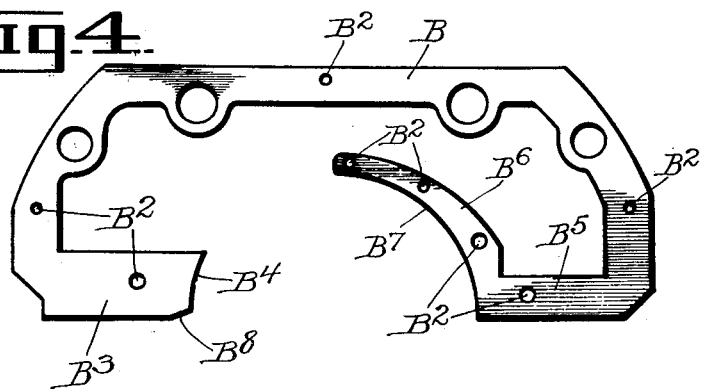
Figure 4 is a detail of one of the field laminations.
Figure 5:
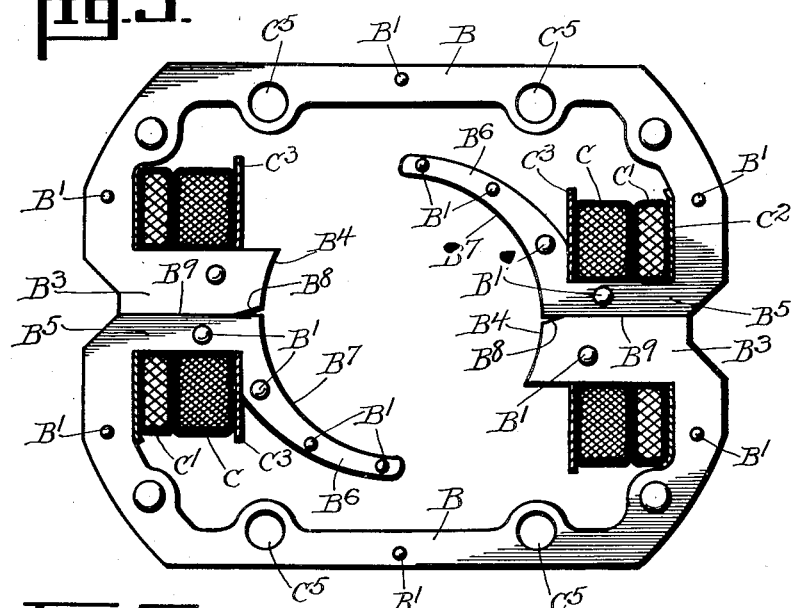
Figure 5 is a diagrammatic view of the assembled field laminations and coil.
Figure 6:
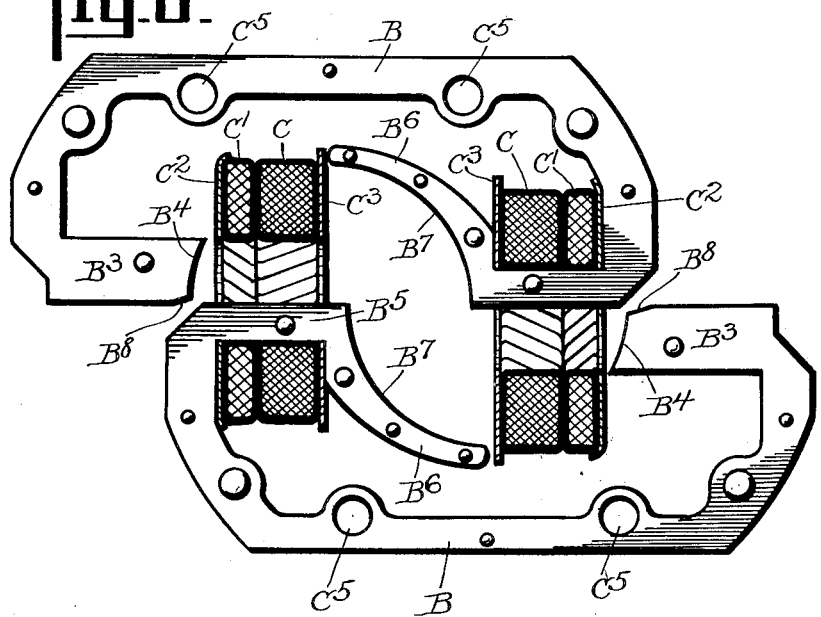
Figure 6 is a diagrammatic view similar to Figure 5 with the coils displaced before assembly.

When the laminations are assembled to form pole pieces, we have two separate groups as indicated particularly in Figures 5 and 6, which groups are identical, but for assembly are reversed. When brought together as shown in Figure 5, there is formed two continuous magnetic circuits divided one above and one below the armature. Magnetic flux passes around above and below through a continuous lamination. There is a dividing line between the upper and lower groups of laminations as at $B^9$ but this dividing line located as it is adjacent the center of the pole piece where it passes through the coil, extends in the same direction as the travel of the magnetic flux. Each pole piece as assembled is made up of one of a group of parts $B^3$ and above or below a group of parts $B^5$ with the surface $B^7$ on one group substantially continuing the surface on the other so as to give a relatively wide pole arc.

C, $C^1$ are the field coils, shown in this instance as arranged for a shunt wound generator. These coils are surrounded by insulating plates or panels $C^2$, $C^3$ and are mounted on the pole piece formed by the parts $B^3$ and $B^5$. In assembling the device, the two coils will be placed respectively on the upper and lower halves of the field laminations and brought into the position shown in Figure 6. Then the two halves are moved laterally with respect one to the other so as to bring the two pole forming elements together into the position shown in Figure 5. The parts $B^3$ are cut away at $B^8$ so as to give an inclined guiding surface to insure ease in bringing the parts together and to prevent binding. The assembly is then placed in the housing being seated on the pad against the ring or collar A² and is fastened in position by the four holding screws C⁴. The perforations C⁵ in the laminations permit the insertion of supporting arms, not here shown, which may carry the brush assembly so that the installation itself is self-contained and so that the brushes do not need to be mounted on the cast cylindrical housing, thus making it possible to use a thin housing of substantially uniform cross section and minimizing magnetic leakage.

It is simple enough to assemble the field laminations for an electric motor or generator of this kind in the shop. The tension of the holding screws may be accurately predetermined and thus the reluctance in the system may be conveniently adjusted whether there is a line of cleavage across the line of magnetic flux or not. In the field, however, as for instance a locomotive round-house or back-shop, it is not so easy to be sure of this and if a machine is properly adjusted under factory conditions, it is possible that the mechanic who reassembles it may not tighten up the screws and you may have some play between the opposed surfaces and this would increase magnetic reluctance if the line of cleavage goes across the line of travel of the flux. In the proposed structure, however, by providing a continuous arrangement so that there is an uninterrupted path for the flux, such difficulties do not arise because it makes no difference how tight the holding screws in my proposed device are tightened, the reluctance is the same because the degree of closeness of fit between the laminations themselves or between the upper and lower laminations is of no particular consequence owing to the fact that the cleavage lines are parallel with the flux.

By mounting the coils by the labyrinth method as indicated, assurance is had that if the coils and pole pieces are assembled so that they will go into the housing at all, they are in proper position and the structure of the pole itself holds the coil in position, thus bolts, screws and the like which would otherwise need to be employed to hold the poles in the housing and to hold the coils on the poles might be dispensed with and it becomes necessary to have only the four holding screws to seat the pad on the ring in the housing.

It will be evident that while I have shown in my drawings an operative device, still many changes might be made in the size, shape and arrangement of parts without departing materially from the spirit of my invention, and I wish, therefore, that my drawings be regarded as in a sense diagrammatic.

I claim:

1. A field lamination for electric machines comprising a transverse element having a laterally extended portion at either end and pole pieces inwardly extending substantially parallel with the transverse element from such opposed lateral extensions, the pole pieces being of different width measured in a direction normal to the transverse element.

2. A field lamination for electric machines comprising a transverse element having a laterally extended portion at either end and pole pieces inwardly extending substantially parallel with the transverse element from such opposed lateral extensions, the pole pieces being of different width measured in a direction normal to the transverse element, and a horn extending inwardly toward the transverse element from the narrower of the two pole pieces.

3. In an electric machine, a two part field magnet, there being two pole forming elements integral with each of the field magnet parts, adjacent pole elements on opposed field magnet parts engaging to form a pole piece, a field coil surrounding each such pole piece, and a notch in one of the pole elements in which the coil is held the walls of the notch being parallel with the plane of the coil, the other element of the pair being perpendicular to the plane of the coil and adapted to penetrate the coil and lock it in the notch.

4. In an electric machine, a two part field magnet, there being two pole forming elements integral with each of the field magnet parts, adjacent pole elements on opposed field magnet parts engaging to form a pole piece, a field coil surrounding each such pole piece, and a notch in one of the pole elements in which the coil is held the walls of the notch being parallel with the plane of the coil, the other element of the pair being perpendicular to the plane of the coil and adapted to penetrate the coil and lock it in the notch, a horn projecting laterally from the notched pole element and having a curved surface adapted to generally conform to the rotor.

5. In an electric machine, a two part field magnet, there being two pole forming elements integral with each of the field magnet parts, adjacent pole elements on opposed field magnet parts engaging to form a pole piece, a field coil surrounding each such pole piece, and a notch in one of the pole elements in which the coil is held the walls of the notch being parallel with the plane of the coil, the other element of the pair being perpendicular to the plane of the coil and adapted to penetrate the coil and lock it in the notch, the unnotched pole forming element being chamfered where it enters the coil to permit ease of assembly.

6. In an electric machine, a two part field magnet, there being two pole forming elements integral with each of the field magnet parts, adjacent pole elements on opposed field magnet parts engaging to form a pole piece, a field coil surrounding each such pole piece, and a notch in one of the pole elements in which the coil is held the walls of the notch being parallel with the plane of the coil, the other element of the pair being perpendicular to the plane of the coil and adapted to penetrate the coil and lock it in the notch, a cylindrical housing enclosing the field magnet, the field forming elements having segmental cylindrical surfaces to engage the cylindrical housing whereby the parts are held in assembled position by the housing.

7. In an electric machine, two separate field elements, there being pole elements at either end thereof adapted to be brought together to form two pole pieces, one only of the pole elements having a horn projecting toward the other and provided with a curved surface to conform to the rotor, field coils adapted to be mounted on said pole pieces, the distance between the end of the horn and the opposed pole element being sufficient to permit movement of the coil across the face of the pole element for assembly, the inner diameter of the coil being substantially equal to the thickness of the pole piece.

8. In an electric machine, two separate field elements, there being pole elements at either end thereof adapted to be brought together to form two pole pieces, one only of the pole elements having a horn projecting toward the other and provided with a curved surface to conform to the rotor, field coils adapted to be mounted on said pole pieces, the distance between the end of the horn and the opposed pole element being sufficient to permit movement of the coil across the face of the pole element for assembly, the inner diameter of the coil being substantially equal to the thickness of the pole piece, notches in the pole pieces adapted to position the coil, the coil being locked in the notch when the pole pieces are assembled.

Signed at Chicago, county of Cook and State of Illinois, this 30th day of November, 1923.

CHARLES W. DAKE.